Figure 1:
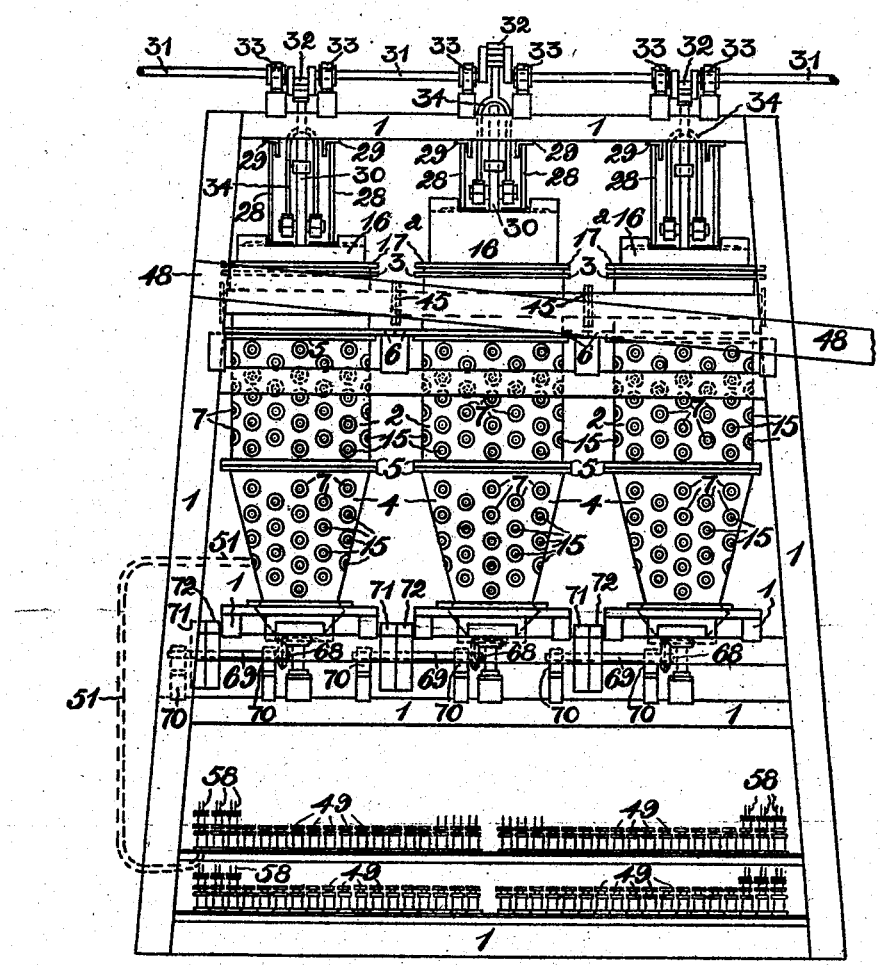

A. J. ARBUCKLE.
CONTINUOUS FILTER PRESS.
APPLICATION FILED MAY 11, 1908.

905,129.

Patented Dec. 1, 1908.
8 SHEETS—SHEET 1.

Witnesses:

Inventor:
Alexander John Arbuckle
by Chas. Obendale
Attorney.

A. J. ARBUCKLE.
CONTINUOUS FILTER PRESS.
APPLICATION FILED MAY 11, 1908.
905,129.
Patented Dec. 1, 1908.
3 SHEETS—SHEET 3.
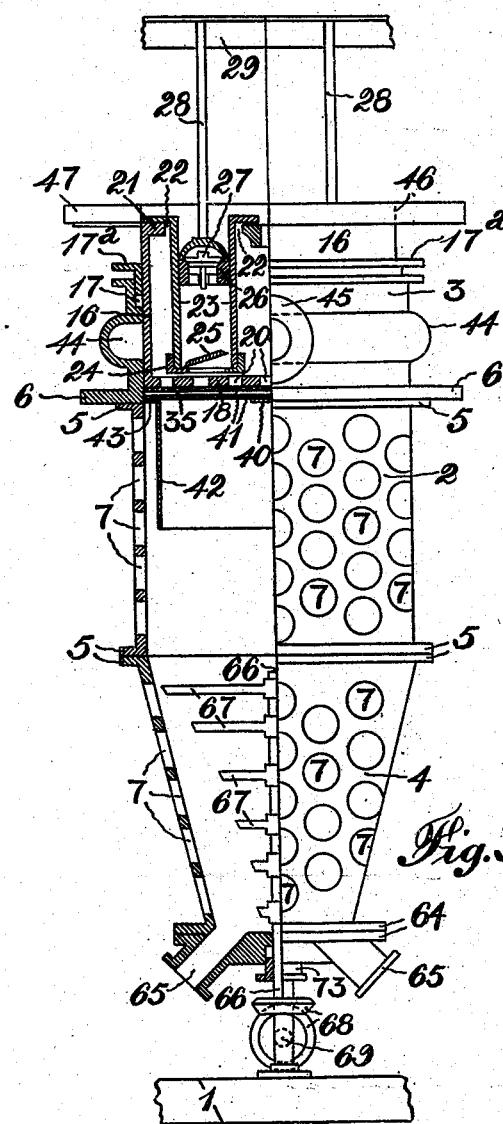
Fig. 3.
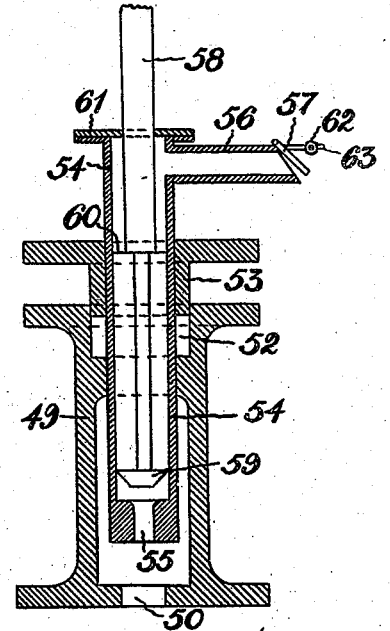
Fig. 7.
Fig. 4.
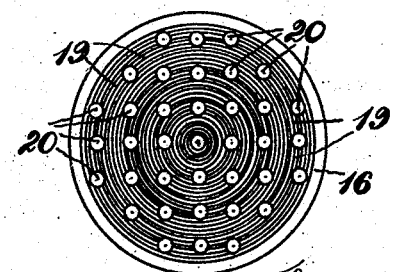
Fig. 5.
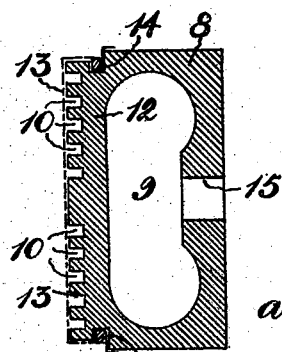
Fig. 6.
Witnesses:
Inventor:
Alexander John Arbuckle
by
Chas. Ovendale
Attorney.

UNITED STATES PATENT OFFICE.

ALEXANDER JOHN ARBUCKLE, OF JOHANNESBURG, TRANSVAAL.

CONTINUOUS FILTER-PRESS.

No. 905,129.            Specification of Letters Patent.            Patented Dec. 1, 1908.

Application filed May 11, 1908. Serial No. 432,090.

*To all whom it may concern:*

Be it known that I, ALEXANDER JOHN ARBUCKLE, a subject of the King of Great Britain, and resident of Johannesburg, Transvaal, have invented certain new and useful Improvements in Continuous Filter-Presses, of which the following is a specification.

This invention relates to continuous filtering apparatus of the type known as filter presses and is primarily designed for effecting the continuous separation of cyanid or other solvent solutions, water washes and the like, from crushed ore products.

The invention may however be utilized for effecting the separation of other solids from liquid, as for example for removing the solids from sewage and the like.

The apparatus comprises a vessel for receiving the mixture of solids and liquid, which vessel may comprise a main cylindrical or other suitably shaped upper section and an inverted conical or funnel shaped base or lower section, bolted or otherwise suitably attached thereto or formed in one piece therewith.

In the walls of the upper and lower sections of the vessel are provided a plurality of detachable filtering devices. These devices are preferably connected by suitable tubular connections with a pump or pumps for returning a small quantity of the solution with more or less sudden impact against and through the filtering medium of said devices, to prevent the closing of the interstices of said medium.

In the upper portion of the receiving vessel is arranged a main piston, plunger, or press to which a reciprocating motion is imparted. The mixture of solids and liquid enters the vessel through a preferably annular chamber or recess formed round the upper portion of the receiving vessel on the inside, and the mixture or charge flows into said vessel from said annular chamber or recess when the piston, plunger or press moves in an upward direction. The lower and inner end of the main piston, plunger or press, is perforated and to it is attached a filtering medium. A hollow cylinder is also preferably attached to the underside of the piston or plunger and concentrically disposed inside the receiving vessel, which serves to divert the incoming mixture or charge into the receiving vessel some distance below the bottom of the main piston or plunger. In the main piston or plunger are provided one or more pumping devices which serve for withdrawing the separated liquid from the interior of the main piston or plunger and delivering it into a launder or receptacle surrounding the upper portion of said piston or plunger. Within the lower inverted conical section of the receiving vessel is arranged a rotatable shaft on which are provided arms or blades which operate to discharge or accelerate the discharge of the separated solids through an outlet or outlets provided at the bottom of the vessel.

Figure 2:
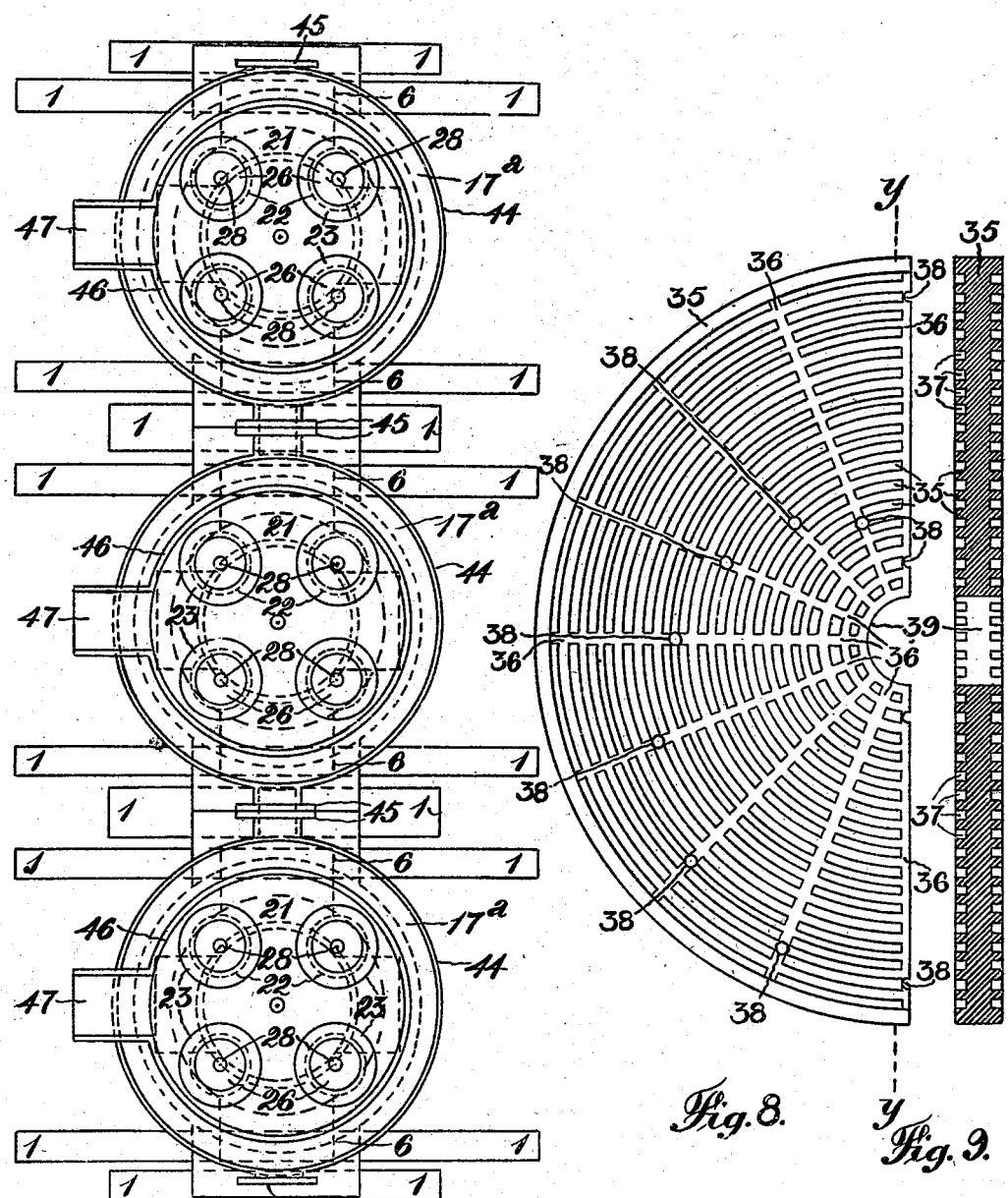

The invention will now be more fully described by aid of the accompanying drawings, wherein Figure 1 is an elevation of a machine comprising three of the filtering apparatus or filter presses. Fig. 2 is a plan of Fig. 1 with the driving mechanism removed. Fig. 3 is an elevation, partly in section of one of the filtering presses. Fig. 4 is a plan of the underside of the main piston or plunger. Fig. 5 is an elevation of one of the filtering devices (8) as seen from the inside with the filtering medium removed. Fig. 6 is a sectional elevation of Fig. 5 on the line $x$—$x$ with the filtering material in position. Fig. 7 is a sectional elevation of one of the back pressure pumps for returning a portion of the liquid through the filtering device 8. Fig. 8 is a plan of one half of the main filter plate 35, and Fig. 9 is a transverse section of the filter plate 35, on the line $y$—$y$ of Fig. 8.

1 represents a framework or structure for carrying the three filter presses, and the driving gear therefor.

The receiving and separating vessel of each of the filter presses is shown consisting of an intermediate section 2 flanged at both ends, an upper section 3 flanged at both ends, and a lower inverted conical or funnel shaped section 4, also flanged at both ends. These several sections are bolted, riveted or otherwise secured together through the flanges 5, see Fig. 3. The bottom flange of the upper section 3 is shown formed with lateral extensions 6, see more particularly Fig. 3, which rest upon the timbers of the framework or structure 1 for supporting the receiving vessel.

While I prefer to construct the vessel in sections for convenience in manufacture and in the working of the apparatus, it will be apparent that this vessel may be constructed in one piece or that any two sections of the receiving vessel may be made in one piece.

In the walls of the intermediate and lower sections 2, 4, are formed apertures 7 in which are fitted detachable filtering devices. One of the detachable filtering devices is illustrated in detail in Figs. 3 and 6. It comprises a plate or piece 8 which is made hollow to form a receiving chamber 9 for the filtered liquid. In the inner face of the plate or piece 8 are formed concentric circular grooves 10 which communicate with the chamber 9, the rings 11 formed by the grooved face being connected by the webs or ribs 12. Over the perforated and grooved inner face of the plate 8 is fixed filter cloth or other suitable filtering material 13 which may be clamped or otherwise secured in position in the peripheral groove 14 or otherwise. In the outside of the plate 8 is formed a hole 15 which communicates with the chamber 9. The hole 15 is made of a sufficient size to allow for the free passage of the filtered liquid into a flexible or rigid pipe or tube communicating with a back pressure pump hereinafter referred to. The several filtering devices may be formed with an external screw thread and be screwed into the apertures 7 in the sections 2, 4, of the vessel, or be bolted or otherwise suitably fixed thereto.

Arranged in the upper section 3 or upper portion of the receiving and separating vessel is a main piston, plunger or press comprising the cylinder 16 made a sliding fit inside the vessel. The upper section 3 is constructed to provide a stuffing box 17 for a gland 17ª round the cylinder 16, for making a liquid-tight sliding joint round the latter. The bottom or inner end 18 of the cylinder 16, which may be formed in one piece with the cylinder, is perforated and, see Fig. 4, grooved on the outside, the grooves 19 serving to place the perforations or apertures 20 in communication. The top 21 which may also be constructed in one piece with the cylinder 16, is formed with one or more apertures 22 in which are arranged lift pumps. These lift pumps are shown comprising a cylindrical casing or pump barrel 23 flanged at the top and fixed to the top or cover 21. Fixed to the lower end of the pump barrel 23 is a cover 24 which forms a seating for the suction valve 25. 26 represents the bucket or piston and 27 the delivery valve. The pump rod 28 which is attached to the bucket or piston 26 is rigidly attached to an angle iron cross-piece 29 secured to the top horizontal beams of the framework or structure 1. In this way the bucket or piston 26 is held stationary while the pump barrel 23 is reciprocated with the main piston, plunger or press 16. In the drawing I show each main piston, plunger or press provided with four of the lift pumps, although more or less may be provided. In place of the lift pumps shown any other suitable type of pump may be employed. The main piston plunger or press 16 is reciprocated within the upper and intermediate sections 3, 2, of the receiving and separating vessel by means of a rod 30 rigidly attached thereto.

31 is a crank shaft provided with a crank 32 for each main piston, plunger or press. This shaft 31 runs in bearings 33 carried by the main structure 1 above each receiving vessel. Connection is made between the rods 30 and their cranks 32 by means of bifurcated connecting rods 34.

For each press I provide a filter plate 35, which as shown in detail in Figs. 8 and 9, is grooved concentrically on both faces and constructed with radiating grooves 36. The concentric grooves 37 and radial grooves 36 form channels along which the separated liquid may pass through holes 38 formed through the plate in suitable positions. The plate 35 is constructed with a central hole 39 for securing it by means of a plate 40, see Fig. 3, to the bottom 18 of the press. One or both sides of the filter plate 35 is or are covered with filter cloth or other suitable filtering material 41, as found requisite or desirable.

To the bottom 18 of the press is fixed a cylinder 42, open at both ends, which is concentrically disposed within the receiving vessel. It is formed at the top with an external flange 43 for fixing it to the bottom 18 of the press. The set screws or equivalent means used for fixing the cylinder 42, may also serve for attaching the filter plate 35 to the press.

The upper section 3 of the receiving vessel is constructed as shown more particularly in connection with Fig. 3 to provide an annular internal recess 44 surrounding the plunger or press 16. It is also constructed with flanged inlet branches 45, see Figs. 2 and 3, which serve for introducing the mixture of solids and liquid into said annular recess 44. The mixture enters the receiving vessel when the main plunger or press 16 moves sufficiently far in an upward direction to uncover or partially uncover said recess 44, the cylinder 42 then serving to deflect the incoming stream into the intermediate section 2 of the vessel. On the down stroke of the plunger or press the recess 44 is closed to the vessel and the supply cut off. As shown in connection with Figs. 1 and 2 the flanged branches 45 are bolted together so that the mixture flows from the annular recess 44 of the one vessel to the annular recesses of the other vessels. The mixture is conveyed by pipe communicating with one or more branches 45 of the vessels.

Surrounding the top 21 of each main plunger or press 16 is a launder 46 of annular or other suitable shape provided with a discharge spout 47, see Fig. 2. This annular launder 46 may as shown consist of a projection formed round the top of the plunger, or be made as a separate part suitably attached thereto in any convenient position. Into this launder flows the solution or liquid separated by the press 16 and lifted by the pumps 23 into the top of the plunger. It leaves the launder by the discharge spout 47 which may be arranged to discharge into an inclined launder 48, see Fig. 1.

For each of the filtering devices or filter plates 8 I preferably provide a suitable small back pressure pump. These back pressure pumps, as shown in connection with Fig. 1, may be in two or any other suitable number of tiers or rows in the lower portion of the framework or structure 1, or in any other suitable position in relation to the receiving and separating vessels. The pumps may be worked by means of a shaft and gearing located in any convenient position in relation thereto, as for example in the space immediately above them in the framework. This driving mechansim for the pumps is arranged so that they work synchronously with the main piston, plunger or press 16 and so that the number of strokes of the back pressure pumps shall be the same as those of the main plunger or press. Instead of employing separate pumps for each filtering device 8 one pump might be employed with separate pipes and connections, means being provided for shutting off or closing any one pipe.

In Fig. 7 I show one of the back pressure pumps drawn to an enlarged scale. It comprises a cylinder or casing 49 provided with an aperture 50 at the bottom to which is connected one end of a flexible or rigid pipe 51, see Fig. 1, the other end of which pipe is attached to the aperture in the outside of the filter plate 8, to place the chamber 9 in communication with the interior of the cylinder or casing 49. The cylinder 49 is constructed to form a stuffing box 52 at the top in which is fitted a gland 53. 54 is a hollow plunger formed with an aperture 55 at the bottom and constructed at the top with a discharge pipe 56 and sluice valve 57. The pipes 56 of the several pumps may be arranged to discharge the separated solution or liquid into a launder or other means along which it may flow to the sump or otherwise for treatment to recover the metal contents of the solution or liquid. 58 is the pump rod working within the hollow plunger 54 and constructed at the lower end as a piston valve 59 and formed with a shoulder or projection 60. 61 is a cover for the top of the hollow plunger 54 through which cover the pump rod 58 works.

The pipe 51 connecting the filter plate 8 with the cylinder 49 is preferably attached to the former by means of a union so that it can be readily disconnected and the filter plate 8 immediately removed for renewal of the filter cloth, or otherwise as required. A valve is preferably provided for each pipe 51, which valve may be conveniently fixed to the filter plate 8 so as to allow any filter plate to be shut off, as for example in the event of a filter cloth becoming damaged, or for any other reason, without unduly interfering with the operation of the apparatus. The sluice valve 57 controls the pressure against the liquid discharged from its filter plate 8 so that the connecting pipe 51 between said filter plate and back-pressure pump shall always be full of separated solution or liquid. This sluice valve 57 is adjusted by a weight 62 fixed by means of set-screw or the like on an arm or lever 63.

On to the flanged lower end of the inverted conical or funnel shaped section 4 of the receiving vessel is fixed a cover or plate 64 constructed to form outlets 65 for the separated solid matter. The separated solid matter discharged through the outlets 65 may be delivered into a puddler or a tank for re-washing or further treatment with the solvent solution, or be conveyed in any convenient manner to a residue dump or depositing site. These outlet branches 65 may, as shown, be constructed with flanges for fixing thereto a blind valve or plate for closing them when commencing the operation of the press and until such time as a sufficient accumulation of the solids has been obtained in the receiving vessel. The blind valves or plates are then removed and the discharge of the solids is then continuous. Within the lower conical or funnel shaped section 4 of the receiving vessel are arranged means for accelerating the discharge of the solids through the outlets 65. These means are shown comprising a vertical shaft 66 on which are secured radial or other suitably disposed arms or blades 67. The shaft 66 at its lower end is supported in a footstep or other suitable bearing carried by the main structure and at its upper end runs in a bearing carried by a suitable bracket or fixture inside the vessel. Motion is imparted to the shaft 66 through bevel gearing 68 from a horizontal shaft 69 which runs in bearings 70 carried by the framework. 71 72 are fast and loose pulleys for imparting rotary motion to the shaft 69. Separate driving gear is shown provided for each press.

73 is a gland fitted in the cover 64 round the vertical shaft 66.

The operation of the machine is as follows:—On starting the press the outlets 65 at the bottom of the conical or funnel shaped section 4 are closed and the supply of the mixture of solids and liquid admitted to the annular recess 44. The means reciprocating the main piston plunger or press 16 within the upper section of the receiving vessel, may then be set in motion, or said plunger may be raised and placed in such a position that the annular recess 44 is placed in communication with the intermediate and lower sections 2, 4, the press being maintained in this position until both sections are filled or nearly filled with the mixture of solids and liquid. The reciprocation of the main piston plunger or press 16 may then be commenced. The back-pressure pumps 49, may, in the meantime, have been set in motion. At each down stroke of the press 16 a quantity of the liquid or solution is forced through the filtering material 41 beneath the filter plate 35, through filter plate 35, through the filtering material 41 between the filter plate and perforated bottom or cover 18 of the main piston or plunger 16, and through the cover 18 into the interior of the main piston or plunger. From the latter it passes into the barrels 23 of the lift pumps at each down stroke of the main piston or plunger, being delivered on to the top or cover 21 of the main piston or plunger at each down stroke by means of the bucket and delivery valves 27. The filtered liquid then leaves by the annular launder 46 and spout 47 and flows into the launder 48, along which, as previously stated, it may flow to any desired point for further treatment, or otherwise as preferred. On the downstroke of the main piston or plunger 16 a quantity of the solution or liquid is also forced through the filtering devices 8. The covers and the outlets 65 at the bottom of the receiving vessel are kept closed until a sufficient quantity of the solids has been deposited or accumulated in the lower portion 4 of the vessel, say until the pressure in the cylinder indicated by pressure-gage in communication with the intermediate section 2, equals twenty-five pounds per square inch or thereabout. The blind valves or covers of the outlets 65 are then opened or removed, and the separation of the liquid from the solids, and the discharge of the liquid and solids, is thereafter continuous, except for the renewal from time to time of the filtering material, as may be required, which may be easily and quickly effected. The slimes or mixture of solids and liquid is then forced into the receiving vessel through the annular recess 44 under a pressure of about 25 pounds per square inch. The incoming stream passes down on to the cushion or deposit of solids in the section 4, filling the intermediate section 2 at each upstroke of the main piston or plunger 16. The solids readily precipitate and the greater portion of the solution passes within the concentric cylinder 42. This solution is found to be comparatively free from solid matter and it is pumped out by the lift pumps as previously explained. On each down stroke of the main piston or plunger 16 the whole of the matter in the intermediate and lower sections 2, 4, is compressed, the solution being forced through into the interior of the main piston or plunger and through the filtering devices 8 in the walls of the intermediate and lower sections 2, 4. On the completion of the down stroke of the main piston or plunger the solid matter in the lower section 4 is practically freed from solution or liquid and by succeeding strokes is forced out through the outlets 65 for further treatment or for final disposal. The mixture being introduced into the receiving vessel under a pressure of twenty five pounds per square inch or thereabout thoroughly cleanses the whole area of the receiving vessel of any solids adhering thereto above the cushion of solids in the lower section 4 after each stroke of the main piston or plunger 16.

The filtering operation causes or tends to cause particles of the solids to adhere to and accumulate on the inner surfaces of the filter cloth, which, if allowed to remain, would materially impair the efficiency of the filter. The adhering solid matter is removed after each downstroke of the plunger or press by passing a small quantity of the separated solution or liquid over the whole area of each filter cloth from the back or in the reverse direction to the filtering flow, with a sudden impact. In the case of the detachable filtering devices 8, this is accomplished by means of the back-pressure pumps, and in the case of the large filter plate carried by the main piston plunger or press, by a small quantity of the separated solution or liquid which remains on the upper surface of the plate 35 and perforated bottom 18, after each stroke. By the upstroke of the main plunger 16 a partial vacuum is created in the receiving vessel, and immediately the upstroke is commenced the solution on the top of the plate 35 and perforated bottom 18 is drawn back through the filtering material 41 due to the partial vacuum beneath it. This at once removes any adhering solids. If this reverse flow were permitted to continue for a sufficient length of time the whole of the separated solution or liquid above the filter plate 35 would be drawn back into the receiving vessel. This however is not necessary as but little of the solution or liquid is required to cleanse the cloth, owing to the shock produced by the reversal of the direction of flow of the liquid. As soon as the cloth is cleansed the partial vacuum created by the upstroke of the main plunger 16 is destroyed by the action of the back-pressure pumps 49, the latter being arranged so as to come into action almost immediately the main plunger 16 commences its upstroke. The necessary quantity of solution or liquid for cleaning the main filter is obtained by adjusting the back-pressure pumps to act at any necessary position of the main plunger during its upstroke.

The requisite quantity of solution or liquid to remove the solids adhering to the filtering material used in the devices 8 is forced by the pumps with the required impact against the back of the cloths in the reverse direction to that of the filtering flow. The proper working of the pumps is insured by the pump 49, pipe 51 and chamber 9 in the filter plate 8 being kept full of solution or liquid by the action of the adjustable sluice valve 57 provided on the end of the discharge pipe 56, see Fig. 7. The action of the back-pressure pumps is as follows:—The pump rod 58 is connected to a crank shaft, eccentric, or other gear, arranged to impart to it the same number of strokes as that of the main piston or plunger 16. Assuming the plungers 54, 58, to be at the bottom of their stroke, then the piston valve 59 is on its seat in the hollow plunger 54. On the upstroke of the pump-rod 58 the piston valve 59 rises until the shoulder 60 comes into contact with the cover 61 of the hollow plunger 54. As it continues to rise the pump rod 58 raises the hollow plunger until the upstroke is completed. On the downstroke the pump rod 58 moves within the hollow plunger 54 until the piston valve 59 contacts with its seat, whereupon the continued downstroke of the pump rod 58 converts the hollow plunger 54 into a ram and forces the column of solution or liquid in the pipe 51 against the back of the filtering material with sufficient impact to remove the adhering solids. From the time the piston valve 59 leaves its seat in the bottom of the hollow plunger 54 on the commencement of the upstroke until it again comes into contact with the seat during the downstroke, the solution or liquid passing through the detachable filters 8 has a free passage past the piston valve 59, through the hollow plunger 54 and out of the discharge pipe 56. As the downstroke of the main plunger 16 is completed just before the piston valve 59 on its downstroke comes on to its seat in the hollow plunger 54, the discharge of the filtered liquid or solution is accelerated by the pressure through the filtering devices 8 given by the main plunger 16.

What I claim as my invention and desire to protect by Letters Patent is:—

1. In filtering apparatus, the combination of a vessel, and a piston reciprocal therein, said piston carrying filtering means, means for removing the separated liquid from the piston and means for obtaining the flow of a portion of the separated liquid through the filter in a direction opposite to that of the filtering flow.

2. In filtering apparatus, the combination of a vessel and a piston reciprocal therein, said piston being arranged to control the admission of the mixture to the vessel and carrying filtering means through which the liquid is forced by the movement of the piston, means for removing the separated liquid from the piston and means for obtaining the flow of a portion of the liquid through the filter in a direction opposite to that of the filtering flow on the reversal of the movement of the piston.

3. In filtering apparatus, the combination of a vessel for receiving the mixture of solids and liquid, a piston reciprocal therein and adapted to control the admission of the mixture and carrying filter means, and means for diverting the incoming charge some distance below said filtering means.

4. In filtering apparatus, the combination of a vessel constructed to provide an inlet for the mixture of solids and liquid, a piston reciprocally arranged inside the vessel and adapted to control the admission of the mixture to the vessel and carrying filtering means through which the liquid is forced by the movement of the piston, and means consisting of a hollow open ended cylinder fixed to the piston for diverting the incoming charge some distance below said filter means.

5. In filtering apparatus, the combination of a vessel for receiving the mixture of solids and liquid, a piston reciprocally arranged inside said vessel, said piston having a perforated end plate grooved on the outside to make said perforations intercommunicating, filtering material arranged next the end plate, a perforated filter plate having concentric and radial grooves in communication with the perforations and filtering material covering the outside of said latter plate and means for attaching the filtering material and plate to the perforated end plate of the piston.

6. In filtering apparatus, the combination of a vessel, a piston reciprocally arranged inside said vessel, filtering means carried by said piston, a lift-pump comprising a pump barrel and suction valve fixed to and movable with the piston and a stationary bucket and delivery valve for removing the separated liquid from the piston.

7. In filtering apparatus, the combination of a vessel, a plurality of detachable filtering devices fixed in the walls of said vessel, a piston reciprocally arranged inside the vessel and filtering means carried by said piston.

8. In filtering apparatus, the combination of a vessel, a plurality of detachable filtering devices fixed in the walls of said vessel, a piston reciprocally arranged inside the vessel, filtering means carried by said piston and means for causing a quantity of the separated liquid to pass through said filtering devices in the reverse direction to that of the filtering flow.

9. In filtering apparatus, the combination of a vessel, a plurality of detachable filtering devices fixed in the walls of said vessel, a piston reciprocally arranged inside the vessel, filtering means carried by said piston, means for causing a quantity of the separated liquid to pass through said filtering devices in the reverse direction to that of the filtering flow and means for maintaining the detachable filtering devices full of the separated liquid.

10. In filtering apparatus, the combination of a vessel, a plurality of detachable filtering devices fixed in the walls of said vessel, a piston reciprocally arranged inside the vessel and filtering means carried by said piston, means for causing a quantity of the separated liquid to pass through said filtering devices in the reverse direction to that of the filtering flow, and means for maintaining the detachable filtering devices full of the separated liquid, said means comprising an adjustable sluice valve.

11. In filtering apparatus, the combination of a vessel, a plurality of detachable filtering devices fixed in the walls of said vessel, a piston reciprocal inside the vessel, means for passing a quantity of liquid through the filtering devices in the reverse direction to that of the filtering flow comprising a cylinder in communication with each filtering device, a hollow piston in communication at the bottom with the cylinder and having a discharge pipe at the top, a sluice valve fitted to the discharge pipe, a pump rod working within the hollow plunger, said rod carrying a valve adapted to close the aperture in the bottom of the plunger.

12. In filtering apparatus, the combination of a vessel, a plurality of filtering devices in the walls of said vessel, said devices each consisting of a plate having a perforated and grooved inner face communicating with an internal chamber, filtering material covering said perforated and grooved face and means for conducting the separated liquid from said internal chamber.

13. In filtering apparatus, the combination of a vessel, a plurality of filtering devices in the walls of said vessel, said devices each consisting of a plate having a perforated and grooved inner face communicating with an internal chamber, filtering material covering said perforated and grooved face, means for conducting the separated liquid from said internal chamber, and a back pressure pump for forcing a quantity of the separated solution through said filtering device in the reverse direction to that of the filtering flow.

14. In filtering apparatus, the combination of a vessel comprising a cylindrical upper and an inverted conical lower section, said latter section constructed with an outlet for the separated solids, a piston reciprocal within the cylindrical section and filtering devices in the walls of both sections through which the liquid is forced by the movement of the piston.

15. In filtering apparatus, the combination of a vessel comprising a cylindrical upper and an inverted conical lower section, said latter section constructed with an outlet for the separated solids, a piston reciprocal within the cylindrical section, filtering means carried by said piston and filtering devices in the walls of both sections through which the liquid is forced by the movement of the piston.

16. In filtering apparatus, the combination of a vessel comprising a cylindrical upper section and an inverted conical lower section, filtering devices in the walls of both sections, the inverted conical section being constructed at the bottom to provide outlets for the separated solid matter, means for discharging the separated solid matter through said outlets, and a piston reciprocal within the vessel for forcing the liquid through the filtering devices.

17. In filtering apparatus, the combination of a vessel comprising a cylindrical upper section and an inverted conical lower section, filtering devices in the walls of both sections, the inverted conical section being constructed at the bottom to provide outlets for the separated solid matter, means for discharging the separated solid matter through said outlets, a piston reciprocal within the vessel for forcing the liquid through the filtering devices, filtering means carried by the piston, and means for removing the separated liquid from the interior of the piston.

In witness whereof I have hereunto set my hand in the presence of two subscribing witnesses.

ALEXANDER JOHN ARBUCKLE.

Witnesses:
 CHAS. OVENDALE,
 R. OVENDALE.